Patented Aug. 15, 1944

2,356,091

UNITED STATES PATENT OFFICE 2,356,091

COPOLYMERS OF SULPHUR MODIFIED POLYHALOPRENES

Milton John Roedel, Wilmington, Del., assignor to E. I. du Pont de Nemours & Company, Wilmington, Del., a corporation of Delaware No Drawing. Application May 20, 1942, Serial No. 443,716

19 Claims. (Cl. 260—42)

This invention relates to valuable compositions of matter and to a process for their production. More particularly, it relates to copolymers of sulphur-modified polychloroprenes with a polymerizable methacrylic compound and a process for their production.

It is an object of this invention to produce new synthetic polymeric materials. Another object is to provide a method for the production of synthetic rubber-like materials having improved characteristics, especially with regard to their resistance to the action of organic solvents. A further object is to provide plastic, rubber-like materials resembling vulcanized rubber, but having improved characteristics of solvent resistance and of resistance to sunlight and ozone. Another object is to provide new synthetic plastic materials resembling gutta percha or balata. Other objects will appear hereinafter.

These objects have been accomplished by the preparation of copolymers of sulphur-modified polychloroprene with a polymerizable methacrylic compound.

In general, the customary mode of practicing this invention is as follows: Monomeric chloroprene (2-chloro-1,3-butadiene) is polymerized in the presence of 0.2 to 2.0 per cent of sulphur in aqueous emulsion to give a sulphur-modified polychloroprene latex which is substantially free of chloroprene monomer. To this sulphur-modified polychloroprene latex, the monomer of the methacrylic compound is added in the form of an aqueous emulsion which contains 0.1 to 2.0 per cent of ammonium perdisulphate based on the weight of monomer of the methacrylic compound. The resulting mixture is then heated in the range of about 30° C. to about 90° C. until the polymerization has proceeded to the desired extent. At this point, antioxidants and/or stabilizers are preferably added to the latex.

Coagulation of the copolymer latex is readily effected by freezing or by the addition of alcohol, dilute acetic acid, or aqueous solutions of electrolytes such as sodium chloride, aluminum sulphate and the like. The coagulum obtained is then washed and dried on rubber mills in the usual manner unless the copolymer has coagulated in a granular form in which case the copolymer is washed in a basket centrifuge and then dried on the rubber mill. The compounding and curing of the copolymers are carried out by methods commonly used in the art.

The following examples are given to illustrate more fully certain of the preferred embodiments of the invention. The scope of the invention is not limited to these particular examples for there are many suitable variations thereof as will become apparent hereinafter. Parts are given by weight unless otherwise stated.

EXAMPLE I

20/80 METHYL METHACRYLATE/POLYCHLOROPRENE COPOLYMER

A sulphur-modified polychloroprene latex is prepared for use as follows: A mixture consisting of 100 parts of monomeric chloroprene (2-chloro-1,3-butadiene) and 0.75 part of sulphur is emulsified at approximately 25° C. by rapid stirring with 223 parts of water, 1.0 part of the sodium salt of a sulphonated naphthalene-formaldehyde condensation product (prepared according to U. S. Patent No. 1,336,759), and 6.1 parts by volume of a 65 per cent solution of the sodium salt of sulphated oleyl acetate. The temperature of the emulsion rises rapidly and is maintained at 40° C. until the specific gravity of the emulsion reaches a value of 1.060. The small proportion of monomeric chloroprene that remains unpolymerized is recovered by vacuum distillation at room temperature. Then to 266 parts of this sulphur-modified polychloroprene latex (80 parts of polymer on a dry basis) there is added with vigorous stirring a freshly prepared emulsion consisting of 20 parts of methyl methacrylate monomer, 44 parts of water, 0.2 part of ammonium perdisulphate and 2 parts of a 65 per cent solution of the sodium salt of sulphated oleyl acetate. This mixture is stirred and heated at 40° C. for 24 hours in a suitable container at which time the monomer is completely polymerized. Two (2) parts of a 50 per cent aqueous dispersion of a 55:45 eutectic mixture of phenyl-alpha-naphthylamine and diphenylamine, and 8 parts of a 25 per cent aqueous dispersion of tetrabutyl thiuram disulphide are then added to the copolymer latex. The copolymer is then coagulated with the aid of sodium chloride and ethanol and then filtered and thoroughly washed with water and dried. One per cent (1%) of phenyl-beta-naphthylamine and 1 per cent of tetramethyl thiuram disulphide (based on the weight of dry copolymer) are then milled into the copolymer on a warm, smooth-roll, rubber mill. The copolymer obtained is an optically clear, homogeneous, stiff, tough, plasticizable product which differs markedly from either (a) the opaque, non-homogeneous, mixed polymer obtained by intimately mixing separately polymerized methyl methacrylate polymer with sulphur-modified polychloroprene in the same proportions, or (b) the clear, homogeneous, plastic interpolymer obtained by polymerizing monomeric chloroprene with monomeric methyl methacrylate in the presence of sulphur modifying agent.

These differences between 20/80 methyl methacrylate/polychloroprene copolymer, 20/80 polymethyl methacrylate/polychloroprene mixture, and 20/80 methyl methacrylate/chloroprene interpolymer are shown below for the raw polymers and for the corresponding black stock vulcanizates compounded from 100 parts polymer, 1 part hexamethylene ammonium hexamethylene dithiocarbamate, 5 parts wood rosin, 10 parts magnesium oxide, 35 parts carbon black, and 5 parts zinc oxide and cured 30 minutes at 140° C.

*Table*

| Type of sulphur-modified polymer | Description of polymer | Stress for 200% elongation, lbs./in.$^2$ | Tensile strength, lbs./in.$^2$ | Elongation at break in per cent |
|---|---|---|---|---|
| 20/80 methyl methacrylate/polychloroprene copolymer. | Clear, stiff, plasticizable. | 2,750 | 3,900 | 300 |
| 20/80 polymethyl methacrylate/polychloroprene mixture. | Opaque, elastic, plasticizable. | 2,060 | 2,690 | 280 |
| 20/80 methyl methacrylate/chloroprene interpolymer. | Clear, plastic. | 1,340 | 3,450 | 415 |

EXAMPLE II

60/40 ETHYL METHACRYLATE/POLYCHLOROPRENE COPOLYMER

A sulphur-modified polychloroprene latex is prepared for use as follows: A mixture of 100 parts of monomeric chloroprene, 0.65 part of sulphur and 4 parts of wood rosin is emulsified at approximately 25° C. by rapid stirring with 228 parts of water, 0.5 part of the sodium salt of a sulphonated naphthalene-formaldehyde condensation product (prepared according to U. S. Patent No. 1,336,759), 0.5 part of ammonium perdisulphate and 0.8 part of sodium hydroxide. The emulsion is then heated to 40° C. and maintained at that temperature until the specific gravity of the emulsion reaches a value of 1.050 at which point the chloroprene monomer is essentially completely removed. To 139 parts of this sulphur-modified polychloroprene latex (40 parts of polymer on a dry basis) there is added, with vigorous stirring, a freshly prepared emulsion consisting of 60 parts of ethyl methacrylate monomer, 120 parts of water, 0.6 part of ammonium perdisulphate, 0.6 part of the sodium salt of a sulphonated naphthalene-formaldehyde condensation product (prepared according to U. S. Patent No. 1,336,759) and 10.2 parts of an aqueous solution of the sodium salt of a sulphonated paraffin oil which contains about 32 per cent active ingredient. This mixture is then stirred and heated for 4 hours at 60° C. at which point the ethyl methacrylate monomer has been essentially completely copolymerized with the polychloroprene. Two (2) parts of a 50 per cent aqueous dispersion of a 55:45 eutectic mixture of phenyl-alpha-naphthylamine and diphenylamine, and 8 parts of a 25 per cent aqueous dispersion of tetraethyl thiuram disulphide are then added and the copolymer coagulated by the addition of ethanol. The copolymer is then washed in a basket centrifuge and dried on a moderately warm rubber mill after the addition of 1 per cent of phenyl-beta-naphthylamine and 1 per cent of tetraethyl thiuram disulphide (based on the weight of the practically dry copolymer). A clear, stiff, tough, balata-like product is obtained in nearly quantitative yield. By chlorine analysis, the copolymer, the copolymer contains 60 per cent by weight of ethyl methacrylate in a polymerized form. The copolymer is stiff and non-plastic, but can be readily plasticized by the addition of 1 per cent of hexamethylene ammonium hexamethylene dithiocarbamate followed by several minutes of milling on a rubber mill and then can readily be compounded by the following gum stock formulation:

| | Parts |
|---|---|
| Plasticized copolymer | 100 |
| Wood rosin | 5 |
| Light calcined magnesium oxide | 10 |
| Zinc oxide | 4 |

Cure—30 minutes at 140° C.

The cured vulcanizate resembles balata in stiffness, toughness, and springiness. It has the added advantage over balata of being non-thermoplastic at moderately high temperatures. A compounded stock of the plasticized copolymer extrudes well over wire to give a smooth, stiff, tough protective coating which possesses excellent resistance to sunlight and ozone.

EXAMPLE III

80/20 ISOBUTYL METHACRYLATE/POLYCHLOROPRENE COPOLYMER

A mixture of 70 parts (20 parts of polymer on a dry basis) of sulphur-modified polychloroprene latex (prepared as described in Example II) and 80 parts of isobutyl methacrylate is copolymerized and treated according to the exact procedures described in Example II. A nearly quantitative yield is obtained of a clear, extremely stiff, tough, thermoplastic product.

EXAMPLE IV

25/35/40 METHYL METHACRYLATE/n-BUTYL METHACRYLATE/POLYCHLOROPRENE COPOLYMER LATEX

A sulphur-modified polychloroprene latex is prepared for use as follows: A mixture consisting of 100 parts of monomeric chloroprene and 0.6 part of sulphur is emulsified at approximately 25° C. by rapid stirring with 228 parts of water, 4 parts of oleic acid, 1 part of sodium hydroxide, 1.5 parts of the sodium salt of a sulphonated naphthalene-formaldehyde condensation product (prepared according to U. S. Patent No. 1,336,759) and 0.5 part of ammonium perdisulphate. The temperature of the emulsion is maintained at 40° C. until the specific gravity of the emulsion reaches a value of 1.050 at which point the small amount of chloroprene monomer remaining is removed by vacuum distillation. Then to 140 parts of this sulphur-modified polychloroprene latex (40 parts of polymer on a dry basis) there is added, with vigorous stirring, a freshly prepared emulsion consisting of 25 parts of methyl methacrylate monomer, 35 parts of n-butyl methacrylate monomer, 120 parts of water, 2.4 parts of oleic acid, 0.34 part of sodium hydroxide, and 0.6 part of ammonium perdisulphate. The mixture is stirred and heated for 15 hours at 45° C. at the end of which time the methacrylate esters are essentially completely polymerized. Eight (8) parts of a 25 per cent aqueous dispersion of tetraethyl thiuram disulphide are then added to the copolymer latex. This latex is of particular value as a leather dressing.

EXAMPLE V

30/70 METHACRYLIC ANHYDRIDE/POLYCHLOROPRENE COPOLYMER

A mixture of 243 parts (70 parts of polymer on a dry basis) of sulphur-modified polychloroprene latex (prepared as described in Example II) and 30 parts of methacrylic anhydride is polymerized and treated according to the exact procedure described in Example II. A nearly quantitative yield is obtained of a clear, dry, tough, leather-like product. The tough copolymer is readily plasticized by the addition of 1 per cent of hexamethylene ammonium hexamethylene dithiocarbamate on the rubber mill followed by several minutes of milling on cold rolls. When the plastic copolymer is compounded as follows,

| | Parts |
|---|---|
| Plasticized copolymer | 100 |
| Wood rosin | 5 |
| Light calcined magnesium oxide | 10 |
| Zinc oxide | 5 | and cured 30 minutes at 140° C., the following stress-strain data are obtained:

830 lbs./in.$^2$ at 100% elongation
1600 lbs./in.$^2$ at 200% elongation
2400 lbs./in.$^2$ at 300% elongation
3430 lbs./in.$^2$ at 430% elongation (Break value)

After heating a slab of this copolymer gum stock vulcanizate in kerosene for 48 hours at 100° C., the volume increase of the slab is only 50 per cent. The sulphur-modified polychloroprene control, when treated in the same manner but without the addition of the methacrylic anhydride emulsion, gave the following stress-strain data:

160 lbs./in.$^2$ at 100% elongation
270 lbs./in.$^2$ at 200% elongation
380 lbs./in.$^2$ at 300% elongation
2050 lbs./in.$^2$ at 780% elongation (Break value)

After heating a slab of the sulphur-modified polychloroprene gum stock vulcanizate in kerosene for 48 hours at 100° C., the volume increase of the slab is 92 per cent.

EXAMPLE VI

25/75 2-NITRO-2-METHYLPROPYL METHACRYLATE/ POLYCHLOROPRENE COPOLYMER

A mixture of 260 parts (75 parts of polymer on a dry basis) of sulphur-modified polychloroprene latex (prepared as described in Example II) and 25 parts of 2-nitro-2-methylpropyl methacrylate monomer is polymerized and treated according to the exact procedure described in Example II. A nearly quantitative yield is obtained of a clear, tough, leather-like product. The tough copolymer is readily plasticized either by milling on corrugated rolls with cold water or by the addition of 1 per cent of hexamethylene ammonium hexamethylene dithiocarbamate followed by several minutes of milling on cold rolls. When the plastic copolymer is compounded as follows,

| | Parts |
|---|---|
| Plasticized copolymer | 100 |
| Wood rosin | 5 |
| Light calcined magnesium oxide | 10 |
| Carbon black | 36 |
| Zinc oxide | 5 | and cured 30 minutes at 140° C., a tensile strength of 3530 pounds per square inch at 220 per cent elongation is obtained. After heating a slab of the above copolymer black stock vulcanizate in kerosene for 48 hours at 100° C., the volume increase of the slab is only 40 per cent. The sulphur-modified polychloroprene control, when treated in the same manner but without the addition of the 2-nitro-2-methylpropyl methacrylate emulsion, gave a tensile strength of 2450 pounds per square inch at 290 per cent elongation. After heating a slab of the sulphur-modified polychloroprene black stock vulcanizate in kerosene for 48 hours at 100° C., the volume increase is 60 per cent.

EXAMPLE VII

25/75 METHALLYL METHACRYLATE/POLYCHLOROPRENE COPOLYMER

A mixture of 260 parts (75 parts of polymer on a dry basis) of sulphur-modified polychloroprene latex (prepared as described in Example II) and 25 parts of methallyl methacrylate monomer is polymerized and treated according to the exact procedure described in Example II. A nearly quantitative yield is obtained of a clear, tough product. When the product is plasticized, compounded, and cured as in Example VI, a tensile strength of 3500 pounds per square inch at 300 per cent elongation is obtained.

EXAMPLE VIII

30/70 METHACRYLONITRILE/POLYCHLOROPRENE COPOLYMER

A mixture of 243 parts (70 parts of polymer on a dry basis) of sulphur-modified polychloroprene latex (prepared as described in Example II) and 30 parts of methacrylonitrile monomer is polymerized and treated according to the exact procedure described in Example II. A clear, elastic product is obtained in nearly quantitative yield. When the product is plasticized, compounded, and cured as in Example V, the following stress-strain data are obtained for the gum stock vulcanizate:

375 lbs./in.$^2$ at 100% elongation
750 lbs./in.$^2$ at 200% elongation
1120 lbs./in.$^2$ at 300% elongation
3050 lbs./in.$^2$ at 580% elongation (Break value).

The kerosene swell after 48 hours at 100% C. is 66 per cent compared to 92 per cent for the sulphur-modified polychloroprene control. The tensile strength for the sulphur-modified polychloroprene control is 2050 pounds per square inch at 780 per cent elongation.

EXAMPLE IX

A sulphur-modified latex is prepared by polymerizing together chloroprene and methyl methacrylate as follows: A mixture consisting of 75 parts of monomeric chloroprene, 25 parts of methyl methacrylate monomer, and 0.6 part of sulphur is emulsified at approximately 25° C. by rapid stirring with 212 parts of water, 0.5 part of the sodium salt of a sulphonated naphthaleneformaldehyde condensation product (prepared according to U. S. Patent No. 1,336,759), and 15.5 parts by volume of an aqueous solution of the sodium salt of a sulphonated paraffin oil containing about 32 per cent active ingredient. The temperature of the emulsion is maintained at 40° C. until the specific gravity of the emulsion reaches a constant value indicating that the polymerization is complete.

To 319 parts by volume (84 parts of polymer on a dry basis) of the above sulphur-modified methyl methacrylate-chloroprene interpolymer latex, there is added with vigorous stirring 16 parts of methyl methacrylate monomer, and 0.16 part of ammonium perdisulphate dissolved in 32 parts of water. This mixture is then stirred and heated at 60° C. for 4 hours in a suitable vessel. Two (2) parts of a 50 per cent aqueous dispersion of a 55:45 eutectic mixture of phenyl-alpha-naphthylamine and diphenylamine, and 8 parts of a 25 per cent aqueous dispersion of tetraethyl thiuram disulphide are then added and the copolymer coagulated by the addition of sodium chloride solution. The copolymer is then washed in a basket centrifuge and dried on a moderately warm rubber mill after the addition of 1 per cent of phenyl-beta-naphthylamine and 1 per cent of tetraethyl thiuram disulphide (based on the weight of dry copolymer). A clear, tough, leather-like product is obtained in nearly quantitative yield. The tough copolymer is readily plasticized by the addition of 1 per cent of hexamethylene ammonium hexamethylene dithiocarbamate followed by milling for several minutes and then can be readily compounded by the following black stock formulation:

| | Parts |
|---|---|
| Plasticized copolymer | 100 |
| Wood rosin | 5 |
| Light calcined magnesium oxide | 10 |
| Carbon black | 36 |
| Zinc oxide | 5 |

On curing at 140° C. for 30 minutes, the copolymer black stock vulcanizate possesses the following stress-strain characteristics:

2380 lbs./in.² at 200% elongation
3750 lbs./in.² at 336% elongation (Break value).

The volume increase of a slab after immersion in kerosene for 48 hours at 100° C. is 43 per cent. The sulphur-modified chloroprene-methyl methacrylate interpolymer control, which is a clear, plastic product, possesses the following characteristics:

1340 lbs./in.² at 200% elongation
3450 lbs./in.² at 416% elongation (Break value).

The volume increase of a slab after immersion in kerosene for 48 hours at 100° C. is 53 per cent.

The invention is applicable broadly to copolymers of sulphur-modified polymers of a halogen-substituted 1,3-butadiene (haloprene) and to sulphur-modified polymers obtained by polymerizing a haloprene in the presence of up to 50 per cent by weight of another polymerizable material containing the group

such as the chloroprene/isoprene interpolymers, chloroprene/butadiene interpolymers, chloroprene/methyl methacrylate interpolymers, and chloroprene/acrylonitrile interpolymers. By "sulphur-modified" polychloroprene is meant the polymer obtained by polymerizing monomeric chloroprene in emulsion form in the presence of 0.1 to 2.0 per cent sulphur until the desired specific gravity is reached and the polymerization is essentially complete. If polymerization is not completed for any reason, the residual monomeric chloroprene which remains can be recovered by vacuum or steam distillation. These polymeric materials and process for making them are described in U. S. Patent No. 2,264,173, issued November 25, 1941.

The copolymers comprising sulphur-modified polychloroprene are generally stiff, tough, and non-plastic. Fortunately, however, they can be readily plasticized to the desired degree by milling with a small proportion of a thiuram disulphide, preferably a tetra-substituted thiuram disulphide, and especially tetra-alkyl thiuram disulphides such as tetramethyl-, tetraethyl-, tetrabutyl-, or dipentamethylene thiuram disulphide and other agents described in U. S. Patent No. 2,234,215 including the thionaphthols and the substituted ammonium salts of disubstituted dithiocarbamic acid.

The type of structure obtained in these copolymers is not definitely known, but the evidence indicates that there is a close association between the polychloroprene units and the methacrylic units in the final copolymer since other polymerization conditions than those employed in the present process have been found to yield products which are inferior in tensile strength and resemble simple known mixtures of polychloroprene units with polymethacrylic units. As illustrated in Table I, Example I, simple mixtures as well as the polymers formed from monomeric chloroprene and monomeric methacrylic compounds do not possess the stiffness (represented by the stress at 200 per cent elongation) and the high tensile strength of the copolymers described herein.

These copolymers are of particular interest when formulated using ingredients and proportions which yield stiff, tough balata-like products. Such combinations involve, for example, copolymers of sulphur-modified polychloroprene with the lower aliphatic alcohol esters of methacrylic acid. Methyl methacrylate and ethyl methacrylate in particular, when present in amounts of 50 to 65 per cent, give copolymers whose gum stock vulcanizates resemble balata in stiffness, toughness, and springiness and are superior in resistance to ozone. Ethyl methacrylate in particular is preferred since it yields copolymers having excellent stiffness and toughness combined with good hot milling and forming characteristics. Copolymers containing approximately 60 per cent of ethyl methacrylate and 40 per cent of a sulphur-modified polychloroprene appear most suitable for many applications. Methacrylate esters of higher alcohols, on the other hand, give softer, very pliable, thermoplastic copolymers which are useful in certain instances.

The polymerizable methacrylic compounds which fall within the scope of this invention include methacrylic acid, methacrylic anhydride, methacrylamide, methacrylonitrile, and the methacrylic esters such as methyl methacrylate, ethyl methacrylate, propyl methacrylate, isopropyl methacrylate, n-butyl methacrylate, isobutyl methacrylate, octyl methacrylate, methallyl methacrylate, 2-nitro-2-methylpropyl methacrylate, cellosolve methacrylate, etc. Alkyl (1 to 8 carbon atoms) methacrylates are preferred. These polymerizable methacrylic compounds all contain the grouping

and are capable of forming methacrylic acid when subjected to hydrolyzing conditions.

Other polymerizable compounds including acrylates or vinyl compounds such as styrene, vinyl acetate, vinyl chloride, as-dichloroethylene, acrylonitrile, methyl vinyl ketone, butadiene, or isoprene cannot be employed satisfactorily in the process of this invention since these monomers either fail to polymerize sufficiently or give low tensile strength products which appear to be simple mixtures. When other modified polychloroprenes such as those mentioned in U. S. Patent No. 2,264,173, page 4, are substituted for sulphur-modified polychloroprenes, the copolymers formed are of little value because, due to their lack of plasticity or plasticizability, they cannot be compounded and cured readily. This is also true for polychloroprene which has been polymerized in the absence of any modifying agent. Other polydienes, such as polybutadiene, polyisoprene or their interpolymers likewise fail to give the valuable copolymers of this invention when they are substituted for sulphur-modified polychloroprenes.

While this invention has, as one purpose, the making of improved rubber-like materials by the copolymerization of polychloroprene with a polymerizable methacrylic compound, the invention is not limited thereto. Thus, when the methacrylic compound is present in the copolymer in predominant amounts (as in Examples II, III, and IV), the product has resinous or balata-like characteristics, which are superior in some respects to the product obtained by polymerization of the methacrylic compound alone. Accordingly, the invention, in its broadest conception, is not limited to any specific proportions of the separate materials. In general, it may be stated that where rubber-like characteristics are desired, it is preferable to have the sulphur-modified polychloroprene present in amounts varying from 75 per cent to 40 per cent of the total copolymer. Where resinous characteristics are desirable, it is preferable to have the methacrylic acid derivative present in amounts varying from 80 per cent to 60 per cent of the total copolymer. Compositions containing less than 20 per cent of sulphur-modified polychloroprene or less than 25 per cent of methacrylic acid derivative are of little interest due to their similarity to the unmodified parent substance.

It should also be pointed out that, as shown in Example IV, the invention includes, within its scope, copolymers wherein more than one monomeric, polymerizable, unsaturated material is copolymerized with the polychloroprene.

The copolymerization of sulphur-modified polychloroprene with polymerizable methacrylic compounds may be carried out according to known techniques. As illustrated in the examples, the aqueous emulsion technique is preferred in view of the more rapid and readily controlled polymerization by this means. In aqueous emulsion, the polymerization may be carried out under alkaline, neutral, or acidic conditions, the exact conditions for best results to be selected for each combination.

The polymerization catalysts encompassed by the invention comprise inorganic peroxygen compounds such as perdisulphates, perphosphates, percarbonates, perborates, peroxides, etc. Catalysts of this kind which are particularly efficient in the practice of this invention include the sodium, potassium, calcium, barium, and ammonium salts of perdisulphuric acid. Ammonium perdisulphate is especially suitable because of high efficiency, availability, and relative low cost.

The concentration of perdisulphate salt employed may be varied within wide limits. For instance, amounts of perdisulphate varying from 0.1 per cent to 5 per cent of the quantity of monomer employed are operable. In respect to economy of catalyst, quality of product and rapidity of polymerization, the preferred proportion of perdisulphate salts generally lies in the range of 1 per cent to 2 per cent based on the weight of the polymerizable methacrylic compound.

The dispersing agents operable in this invention are, in general, useful in forming stable emulsions which, after they are once formed, require little or no subsequent agitation. These dispersing agents include sodium oleate, sodium rosinate, the sodium salt of sulphated oleyl acetate, the sodium salt of a sulphonated paraffin oil, the sodium salt of the sulphation product of 85 per cent cetyl alcohol, and other dispersing agents disclosed in U. S. Patent No. 2,264,173. It will be understood that the dispersants to which reference is made above are commercial materials which, because of the methods used in their manufacture and because of the sources of the starting materials, are usually not produced in high states of purity and contain minor constituents which influence the effectiveness of the active ingredient. Polymerization systems containing such ancillary ingredients which are present adventitiously or added deliberately, are recognized as part of this invention. These ingredients which are useful only when an operable dispersant is also present may include inorganic salts, long-chain primary alcohols, carbohydrate derivatives, etc.

The operability of the invention is not confined to any particular proportion of polymerizable monomer or monomers relative to the amount of aqueous media present. Thus, the ratio of the aqueous to the non-aqueous phase may vary between approximately 10:1 and 1:1. In general, it is preferred that the aqueous/non-aqueous ratio shall be approximately 3:1 to 1:1 since, for a given reaction vessel, the time-space yield is greatly reduced by the use of higher ratios. It is also helpful in maintaining an emulsion if the proportion, by weight, of non-aqueous to aqueous phases is not greater than 1:1.

The present invention can be operated at any temperature above the freezing point of the aqueous phase which is somewhat below 0° C. up to about 100° C. above which the product may be adversely affected. It is preferred to employ temperatures in the range of 30° C. to 90° C. Extremely low temperatures are generally not preferred because the corresponding rate of reaction is impracticably low.

It is realized that the presence of oxygen in the polymerization vessel, while not appearing to have a deleterious effect on the properties of the polymers of this invention, may adversely affect the rate of polymerization in certain cases. In these cases, it is preferable to displace the air from the polymerization vessel by means of an oxygen-free gas which does not reduce the rate of polymerization. Suitable gases are nitrogen and methane.

The process is not limited to any particular apparatus, but it is important that the reaction vessel shall be constructed of material which has no effect on the rate of polymerization or on the quality of the products and that it is not affected by the aqueous medium used in carrying out the polymerization. The apparatus may also be so constructed that the process is continuous.

In the examples, all of the methacrylic compound is added initially to the aqueous dispersion prior to polymerization. It is within the scope of the present invention to add the methacrylic compound portionwise to the dispersion during the copolymerization, or to add the sulphur-modified polychloroprene latex portionwise to the methacrylic compound dispersion and then to continue the polymerization. The conditions selected for copolymerizing sulphur-modified polychloroprene with a given polymerizable methacrylic compound will depend upon the ease with which the methacrylic compound polymerizes and upon the type of product desired.

At the conclusion of the copolymerization operation, the products of this invention may be isolated by a variety of methods. For example, the copolymers may be isolated by cooling the dispersion below the freezing point of the aqueous medium or by the addition of a lower aliphatic alcohol such as methanol or ethanol. The most satisfactory method consists in adding an appropriate amount of an electrolyte solution to the diluted aqueous dispersion with rapid agitation. Suitable electrolytes include sodium chloride, sodium sulphate, hydrochloric acid, phosphoric acid, acetic acid, calcium chloride, magnesium sulphate and aluminum sulphate. After precipitation, if the physical form is suitable, the copolymer may be filtered and washed with water in a basket centrifuge to remove the water-soluble ingredients. The electrolyte and dispersing agent are often conveniently removed by washing the coagulum with water on a mill consisting of corrugated rolls turning at different speeds or in an internal mixer, by which methods new surfaces of the polymer are being continuously exposed to the washing medium. By these latter two methods, the copolymers made from sulphur-modified polychloroprene are also made more plastic and workable; that is, there is a decrease in the apparent molecular weight as determined by viscosity measurements.

As already stated, products having most diverse properties can be prepared by a suitable choice of type and amount of methacrylic compound used with the sulphur-modified polychloroprene. The products range from soft, elastic solids to tough, balata-like solids. Some of them have properties which make them very useful for the preparation of molded, dipped, coated, and extruded articles, while others are valuable as adhesive, impregnating and film-forming materials. Wire insulation, golf ball covers, leather dressings, paper impregnants, and coating compositions represent uses for which these compositions are particularly suitable. In applying the products of this invention, it is often desirable to combine them with plasticizers, stabilizers, pigments, dyes, fillers, softeners, oils, natural resins, synthetic resins, or synthetic rubber prepared from butadiene, isoprene, etc., or from interpolymers of these dienes with other vinyl compounds. In certain cases, the polymers may also be prepared in the presence of one or more of these materials.

It is apparent that many widely different embodiments of this invention may be made without departing from the spirit and scope thereof, and, therefore, it is not intended to be limited except as indicated in the appended claims.

I claim:

1. A process for making a synthetic material which comprises polymerizing 2-chloro-1,3-butadiene in aqueous emulsion in the presence of 0.2 to 2.0 per cent of sulphur at a temperature of 20° C. to 60° C. until an emulsion of elastic, plasticizable polymer is obtained, adding an emulsion of a polymerizable monomeric compound of the class consisting of methacrylic acid and its derivatives which form methacrylic acid when subjected to hydrolyzing conditions in the amount of 25 to 80 per cent based on the total copolymer formed, adding from 0.1 to 5.0 per cent of an inorganic peroxygen compound, copolymerizing the mixed emulsion at a temperature of 30° C. to 90° C., stabilizing the copolymer latex, coagulating the copolymer, plasticizing the copolymer with a thiuram disulphide, compounding and curing the plastic copolymer.

2. A process for making a synthetic material which comprises polymerizing 2-chloro-1,3-butadiene in aqueous emulsion in the presence of 0.2 to 2.0 per cent of sulphur at a temperature of 20° C. to 60° C. until an emulsion of elastic, plasticizable polymer is obtained, removing unpolymerized monomer, adding an emulsion of monomeric methacrylic anhydride in amount of 25 to 80 per cent based on the total copolymer, adding from 0.1 to 5.0 per cent of a water-soluble perdisulphate, copolymerizing the mixed emulsion at a temperature of 30° C. to 90° C., stabilizing the copolymer latex, coagulating the copolymer, plasticizing the copolymer with a thiuram disulphide, compounding and curing the plastic copolymer.

3. A process for making a synthetic material which comprises polymerizing 2-chloro-1,3-butadiene in aqueous emulsion in the presence of 0.2 to 2.0 per cent of sulphur at a temperature of 20° C. to 60° C. until an emulsion of elastic, plasticizable polymer is obtained, removing unpolymerized monomer, adding an emulsion of monomeric methacrylonitrile in amount of 25 to 80 per cent based on the total copolymer formed, adding from 0.1 to 5.0 per cent of a water-soluble perdisulphate, copolymerizing the mixed emulsion at a temperature of 30° C. to 90° C., stabilizing the copolymer latex, coagulating the copolymer, plasticizing the copolymer with a thiuram disulphide, compounding and curing the plastic copolymer.

4. A process for making a synthetic material which comprises polymerizing 2-chloro-1,3-butadiene in aqueous emulsion in the presence of 0.2 to 2.0 per cent of sulphur at a temperature of 20° C. to 60° C. until an emulsion of elastic, plasticizable polymer is obtained, removing unpolymerized monomer, adding an emulsion of monomeric methacrylate ester in the amount of 25 to 80 per cent based on the copolymer formed, adding from 0.1 to 5.0 per cent of an ammonium perdisulphate, copolymerizing the mixed emulsion at a temperature of 30° C. to 90° C., stabilizing the copolymer latex, coagulating the copolymer, plasticizing the copolymer with a thiuram disulphide, compounding and curing the plastic copolymer.

5. A copolymer obtained by emulsion copolymerization of a sulphur-modified polymer of 2-chloro-1,3-butadiene and a polymerizable monomeric compound of the class consisting of methacrylic acid and its derivatives which form methacrylic acid when subjected to hydrolyzing conditions, said sulphur-modified polymer of 2-chloro-1,3-butadiene being one produced by polymerizing the monomeric compound in emulsion form in the presence of 0.1% to 2.0% of sulphur.

6. A copolymer obtained by emulsion copolymerization of a sulphur-modified polymer of 2-chloro-1,3-butadiene and monomeric methacrylic anhydride, said sulphur-modified polymer of 2-chloro-1,3-butadiene being one produced by polymerizing the monomeric compound in emulsion form in the presence of 0.1% to 2.0% of sulphur.

7. A copolymer obtained by emulsion copolymerization of a sulphur-modified polymer of 2-chloro-1,3-butadiene and monomeric methacrylic anhydride, the sulphur-modified polymer of 2-chloro-1,3-butadiene being present in amounts of 20 to 75 per cent, and being one produced by polymerizing the monomeric compound in emulsion form in the presence of 0.1% to 2.0% of sulphur.

8. A copolymer obtained by emulsion copolymerization of a sulphur-modified polymer of 2-chloro-1,3-butadiene and monomeric methacrylonitrile, said sulphur-modified polymer of 2-chloro-1,3-butadiene being one produced by polymerizing the monomeric compound in emulsion form in the presence of 0.1% to 2.0% of sulphur.

9. A copolymer obtained by emulsion copolymerization of a sulphur-modified polymer of 2-chloro-1,3-butadiene and monomeric methacrylonitrile, the sulphur-modified polymer of 2-chloro-1,3-butadiene being present in amounts of 20 to 75 per cent, and being one produced by polymerizing the monomeric compound in emulsion form in the presence of 0.1% to 2.0% of sulphur.

10. A copolymer obtained by emulsion copolymerization of a sulphur-modified polymer of 2-chloro-1,3-butadiene and a monomeric methacrylic ester, said sulphur-modified polymer of 2-chloro-1,3-butadiene being one produced by polymerizing the monomeric compound in emulsion form in the presence of 0.1% to 2.0% of sulphur.

11. A copolymer obtained by emulsion copolymerization of a sulphur-modified polymer of 2-chloro-1,3-butadiene and a monomeric methacrylic ester, the sulphur-modified polymer of 2-chloro-1,3-butadiene being present in amounts of 20 to 75 per cent, and being one produced by polymerizing the monomeric compound in emulsion form in the presence of 0.1% to 2.0% of sulphur.

12. A copolymer obtained by emulsion copolymerization of a sulphur-modified polymer of 2-chloro-1,3-butadiene and a monomeric alkyl methacrylate having from 1 to 8 carbon atoms in the alkyl radical, said sulphur-modified polymer of 2-chloro-1,3-butadiene being one produced by polymerizing the monomeric compound in emulsion form in the presence of 0.1% to 2% of sulphur.

13. A copolymer obtained by emulsion copolymerization of a sulphur-modified polymer of 2-chloro-1,3-butadiene and a monomeric alkyl methacrylate having from 1 to 8 carbon atoms in the alkyl radical, the sulphur-modified polymer of 2-chloro-1,3-butadiene being present in amounts of 20 to 75 per cent, and being one produced by polymerizing the monomeric compound in emulsion form in the presence of 0.1% to 2.0% of sulphur.

14. A copolymer obtained by emulsion copolymerization of a sulphur-modified polymer of 2-chloro-1,3-butadiene and monomeric ethyl methacrylate, said sulphur-modified polymer of 2-chloro-1,3-butadiene being one produced by polymerizing the monomeric compound in emulsion form in the presence of 0.1% to 2.0% of sulphur.

15. A copolymer obtained by emulsion copolymerization of a sulphur-modified polymer of 2-chloro-1,3-butadiene and monomeric ethyl methacrylate, the sulphur-modified polymer of 2-chloro-1,3-butadiene being present in amount of about 40 per cent, and being one produced by polymerizing the monomeric compound in emulsion form in the presence of 0.1% to 2.0% of sulphur.

16. A process for making a synthetic material, which comprises co-polymerizing, in emulsion, a polymerizable monomeric compound of the class consisting of methacrylic acid and its derivatives which form methacrylic acid when subjected to hydrolyzing conditions with a member of the group consisting of sulphur-modified polymers of 2-halo-1,3-butadienes and sulphur-modified interpolymers of 2-halo-1,3-butadienes with compounds containing the group

which interpolymers contain in excess of 50% of the 2-halo-1,3-butadiene, said sulphur-modified polymers and sulphur-modified interpolymers being those produced by polymerizing the monomeric compounds in emulsion form in the presence of 0.1% to 2.0% of sulphur.

17. A process for making a synthetic material, which comprises co-polymerizing, in emulsion, a polymerizable monomeric compound of the class consisting of methacrylic acid and its derivatives which form methacrylic acid when subjected to hydrolyzing conditions with a member of the group consisting of sulphur-modified polymers of 2-chloro-1,3-butadiene and sulphur-modified interpolymers of 2-chloro-1,3-butadiene with compounds containing the group

which interpolymers contain in excess of 50% of the 2-chloro-1,3-butadiene, said sulphur-modified polymers and sulphur-modified interpolymers being those produced by polymerizing the monomeric compounds in emulsion form in the presence of 0.1% to 2.0% of sulphur.

18. A co-polymer obtained by emulsion co-polymerization of a polymerizable monomeric compound of the class consisting of methacrylic acid and its derivatives which form methacrylic acid when subjected to hydrolyzing conditions and a member of the group consisting of sulphur-modified polymers of 2-halo-1,3-butadienes and sulphur-modified interpolymers of 2-halo-1,3-butadienes with compounds containing the group

which interpolymers contain in excess of 50% of the 2-halo-1,3-butadiene, said sulphur-modified polymers and sulphur-modified interpolymers being those produced by polymerizing the monomeric compounds in emulsion form in the presence of 0.1% to 2.0% of sulphur.

19. A co-polymer obtained by emulsion co-polymerization of a polymerizable monomeric compound of the class consisting of methacrylic acid and its derivatives which form methacrylic acid when subjected to hydrolyzing conditions and a member of the group consisting of sulphur-modified polymers of 2-chloro-1,3-butadiene and sulphur-modified interpolymers of 2-chloro-1,3-butadiene with compounds containing the group

which interpolymers contain in excess of 50% of the 2-chloro-1,3-butadiene, said sulphur-modified polymers and sulphur-modified interpolymers being those produced by polymerizing the monomeric compounds in emulsion form in the presence of 0.1% to 2.0% of sulphur.

MILTON JOHN ROEDEL.